United States Patent [19]

Chu et al.

[11] 4,049,567
[45] Sept. 20, 1977

[54] SILVER HALIDE ACTIVATED PHOTOCHROMIC PLASTICS

[75] Inventors: Nori Y. C. Chu, Southbridge; Peter G. Piusz, Longmeadow, both of Mass.

[73] Assignee: American Optical Corporation, Southbridge, Mass.

[21] Appl. No.: 667,686

[22] Filed: Mar. 17, 1976

[51] Int. Cl.$^2$ .............................................. G03C 1/02
[52] U.S. Cl. ................................ 252/300; 350/160 P
[58] Field of Search .................... 252/300; 350/160 P; 96/90 PC

[56] References Cited

U.S. PATENT DOCUMENTS

| 3,479,186 | 11/1969 | Taylor et al. | 96/114 |
|---|---|---|---|
| 3,508,810 | 4/1970 | Balzer | 350/160 P |
| 3,540,793 | 11/1970 | Araujo et al. | 350/160 P |
| 3,666,352 | 5/1972 | Wagner et al. | 252/300 |
| 3,716,489 | 2/1973 | De Lapp | 252/300 |
| 3,723,349 | 3/1973 | Heseltine et al. | 252/300 |

FOREIGN PATENT DOCUMENTS 888,622   12/1971   Canada

*Primary Examiner*—Benjamin R. Padgett
*Assistant Examiner*—Deborah L. Kyle
*Attorney, Agent, or Firm*—Kenway & Jenney

[57] ABSTRACT

Photochromic plastic materials are disclosed which comprise a polymeric matrix containing a multiplicity of activated silver halide particles less than 1000 Angstroms in size. The matrix may contain a retained amount of plasticizer which optimizes the desirable photochromic properties and may be sealed to prevent loss of plasticizer. The materials are made by forming activated silver halide particles in the presence of a film forming polymer dissolved in a plasticizer and removing the plasticizer to produce a supple, shape-retaining element.

24 Claims, 2 Drawing Figures

SILVER HALIDE ACTIVATED PHOTOCHROMIC PLASTICS

BACKGROUND OF THE INVENTION

Photochromic substances undergo a spontaneous reversible color change on exposure to electromagnetic radiation. For example, a photochromic substance which is transparent and normally colorless will, upon irradiation, turn dark, the degree of darkening being dependent upon the particular substance employed and the degree of irradiation. The basis of photochromic reaction is that photochromic substances, e.g., silver halides, can undergo a chemical reaction wherein species are produced which absorb light to a considerably greater degree than silver halide salts. However, the very essence of photochromism requires that this reaction be reversible so that the substance can again attain its light transmissive state.

While many substances are known which can exhibit photochromism, silver halides are unique and highly desirable for two reasons. First, the photo-induced reactions which these salts exhibit are theoretically fatigue-free, i.e., non diminution of darkening or degree of recovery occurs even after repeated exposures to activating radiation so long as the crystal is properly protected. Second, the light-absorbing activated species produces a grey color in the photochromic material, indicating that substantially all wavelengths of visible light are absorbed.

It is believed that the only successful silver halide based photochromic material are those in which fine particles of photosensitive silver halide are isolated in the substance so that the reaction products are trapped within a microscopic environment where they are available for recombination. One successful substance is a photochromic glass produced by forming minute silver halide crystals in a molten glass matrix and thereafter allowing the glass to cool in a mold. Another successful silver halide based photochromic substance is disclosed in copending U.S. application Ser. No. 544,078, filed Jan. 27, 1975. This application discloses a stabilized photochromic particle comprising a silver halide crystal protected by a coating which is impervious to halogen migration. Since the particles do not interfere with light transmission and since the coating affords effective protection to the silver halide crystals, these particles may be incorporated directly into optically clear prepolymers which may in turn be cast to form polymeric lenses and other opthalmic quality devices.

Attempts to incorporate photosensitive silver halides directly into prepolymers have met with extremely limited success. The reason for this lack of success is believed to be that the silver halide particles are rendered inoperative by the hostile environment present during polymerization or that the structure of the formed polymers allows dissociation of the reaction products produced on activation of the photosensitive particles. While it is possible to achieve a degree of photochromicity in such structures, they have limnited commercial value since they are characterized by rapid fatigue, i.e., permanent darkening caused by the buildup of photolytic products.

SUMMARY OF THE INVENTION

This invention provides a method for directly incorporating photosensitive silver halide crystals in a polymer matrix to produce a photochromic element which is characterized by an extended shelf life, a high degree of variation in light absorbance, and a relatively rapid recovery when the activiating radiation is removed. The process comprises the steps of forming silver halide particles in the presence of a polymeric material such as polyvinylalcohol, polyvinylpyrrolidone, polyacrylic and methacrylic acids, polyalkylenamines, polyalklenimines, or compatible mixtures thereof in a plasticizer for the chosen polymer. The polymers useful in the present invention must be light-transmissive and must act as a ripening inhibitor to prevent overgrowth of the silver halide crystals. In the case of polyvinylpyrrolidone and polyvinylalcohol, water is an effective plasticizer. In these and the other polymers herein disclosed, other plasticizers may be employed, those containing multiple hydroxy functionalities such as glycerin, ethylene glycol, and polyethylene gycol being particularly useful.

The particles of silver halide produced are prohibited from growing to a size greater than 1000 Angstroms by the presence of the polymer, which acts as a ripening inhibitor. In this regard, it has been discovered that the size of the photosensitive crystal is quite critical to the photochromic properties of the system, in that, as the particle size is increased above about 1000 Angstroms, the element produced increasingly exhibits smaller degrees of photochromic behavior.

According to an important aspect of the invention, this light sensitive dispersion is placed in an, e.g., shallow disc shaped mold, and the plasticizer is removed. It has been discovered that it is highly desirable to control the removal of plasticizer such that a supple, shape-retaining but non-brittle matrix is formed. If too much plasticizer is removed, the brittle structure produced is, in general, characterized by rapid loss of the photochromic property. The last step in the process, in the case of volatile plasticizers, is to encase the photochromic plastic element to prevent further loss of plasticizer, thereby maintaining the optimum amount of plasticizer and the photochromicity of the disc.

Accordingly, it is an object of the invention to provide a silver halide activated photochromic plastic material.

Another object of the invention is to provide a photochromic plastic which has an extended shelf-life.

Still another object of the invention is to provide a photochromic plastic material which has a good thermal recovery rate and which sensitively responds to incident activating radiation to transform itself into a light absorbing state.

Another object of the invention is to provide a process for forming silver halide activated photochromic plastics from a considerable number of polymeric materials.

Other advantages and features of the invention will be apparent from the description of the preferred embodiment and from the drawing wherein:

FIG. 1 is a perspective view of an encased photochromic plastic element formed in accordance with th invention; and FIG. 2 is a vertical cross section taken along the line 2—2 of FIG. 1;

DESCRIPTION OF THE PREFERRED EMBODIMENT

Figure 1:
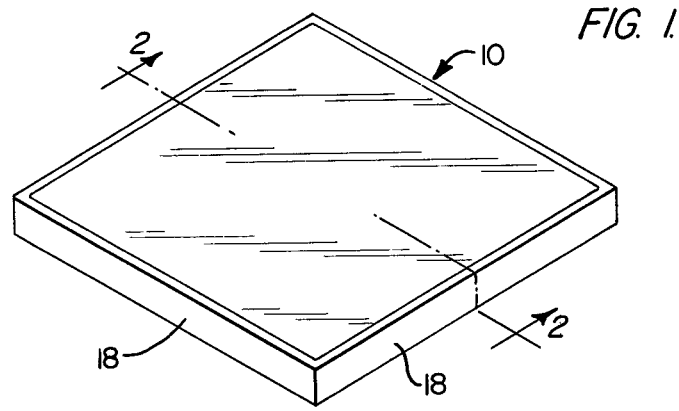
Figure 2:
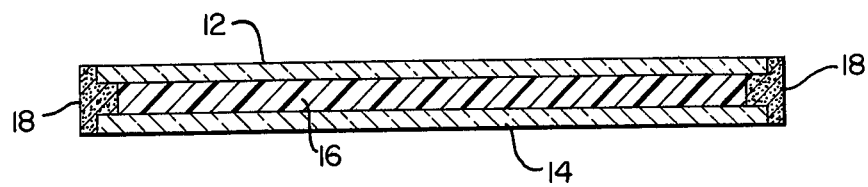

Referring first to the drawing, reference number 10 indicates a photochromic system in the form of a plate produced in accordance with the invention. The system comprises an air-tight seal, in this embodiment taking the form of opposing sheets of glass 12 and 14, in face to face relationship, the photochromic plastic material of the invention 16 being sandwiched therebetween. The peripheral edges of the embodiment of the drawing are connected by a sealing member 18, formed, by way of example only, from an epoxy resin. It should be emphasized that the function of the casing material is to prevent loss of plasticizer from the photochromic plastic material 16 and that it can be made from a wide variety of materials knwon to those skilled in the art which are sufficiently inert so as not to interfere with the photo-induced chemical reactions which take place in the plastic material 16, and which, preferably, are transparent.

Structures such as those disclosed in the drawing may be produced as follows. First, a film-forming solution is prepared from a polymer capable of acting as a ripening inhibitor and a compatible plasticizer. As will become apparent hereinafter, the plasticizer chosen must also be capable of dissolving, or be compatible with a liquid that is capable of dissolving, silver or halide salts. Within this solution, photosensitive silver halide crystals having a particle size as small as possible, but in any case, smaller than 1000 A, are produced.

While a variety of silver halide formation techniques may be employed, it is preferred that the plasticizer chosen be capable of dissolving salts such as sodium or potassium bromide, chloride, and iodide, cuprous chloride, and silver nitrate. In this situation, silver nitrate may be dissolved in the polymer solution to provide $Ag^+$ ions, and thereafter a mixed solution containing halide ions and up to 50 ion percent activating ions which act as hole traps in the silver halide crystals, e.g., $Cu^+$, may be added drop-wise with stirring. This step results in precipitation of microscopic cyrstals of silver halide salts doped with activating ions which will exhibit photochromism in a suitable environment. The presence of the polymer in the solution retards growth or "ripening" of the silver salt particles and greatly facilitates maintenance of the particle size below 1000 A.

An equivalent system is one in which the medium for particle formation compises a compatible mixture of a plasticizer and a halide or silver salt solvent, e.g., when polyvinylpyrrolidone is the polymer employed, a polyethylene glycol or ethylene glycol and water.

The next step in the process involves pouring the film forming solution into a mold and removing the solvent in which the polymer is dissolved to produce a photochromic plastic element of a desired shape. According to one important aspect of the invention, it has been discovered that if all the plasticizer is removed from the forming plastic element, the resulting product, although photochromic, loses its photochromic properties with age, exhibits increasingly long thermal recovery periods after each cycle, and is generally unsatisfactory for most commercial photochromic applicatins. However, if only a portion of the plasticizer is removed, i.e., enough to leave the photochromic plastic matrix in a supple, slightly undercured state, photochromic properties are retained essentially indefinitely.

The optimum amount of plasticizer that should be left in the matrix will depend upon the particular polymer-plasticizer system chosen. Although the choice of the optimum percentage of plasticizer to be retained within the matrix may require some experimentation, one skilled in the art will have little difficulty determining the percentage in veiw of the instant disclosure.

At this point, the silver halide based photochromic plastic element is provided which exhibits a degree of photosensitivity and a shelf-life believed heretofore unattained in silver halide based photochromic plastic materials. However, if the photochromic materials of the invention are left in this unprotected state and if the plasticizer chosen is volatile, the materials lose additional plasticizer to the atmosphere, become brittle, and begin to lose their desirable properties. Accordingly, unless a non-volatile plasticizer is chosen, it is necessary to encase or otherwise protect the plastic photochromic element of the invention to maintain its operative state.

Those skilled in the art will be familiar with many ways to effect this step. Various glasses are admirably suited for this purpose, and advantageously, may be pre-ground to form lenses, etc., which, when laminated about the element of the invention, will exhibit photochromism. Alternatively, various transparent polymeric substances may also be used as an encasing material. In this regard, it should be kept in mind that the encasing material should be sufficiently inert so as not to interfere with the light induced reactions which take place in the photochromic element of the invention.

The invention will be further understood from the following examples, which in no event should be construed as limiting.

EXAMPLE 1

Ten milliliters of 0.1M aqueous $AgNO_3$ solution and 10 milliliters of a mixed aqueous solution containing 60 mole percent KBr, 40 mole percent KCl, and saturated with CuCl ($10^{-4}$M) are added drop-wise, simultaneously, with stirring, over about a 2 minute interval, into a 50 milliliter aqueous solution containing 10% polyvinylalcohol. A film $7 \times 12$ cm $\times 6 \times 10^{-3}$ cm thickness is cast from about 5 ml of the film forming solution. The film is cured for about 30 minutes in a drying oven at 56° C.

When this film is irradiated using a lamp sold under the tradename BLAK-RAY at a distance of 5 cm for 5 minutes, an absorbance of 0.023 is obtained. The absorbance decreases to 0.012 after 1 hour in the dark. Although this reversible activation and de-activation can be repeated several times, the degree of photo coloration and the rate of thermal recovery is not as great as is desirable, and the photochromic effect tends to deteriorate with time.

It has been discovered, however, that the dynamic properties, particularly the thermal recovery rate and the degree of darkening, can be regulated by properly adjusting the amount of water (which acts as a plasticizer in this case) remaining in the plastic film. By sealing the photochromic plastic material within a vapor impervious environment, the plasticizer content can be maintained at desirable levels and hence, the photochromic properties of the material can be indefinitely sustained. The films of the following examples, when sealed, exhibit good photosensitivity, a high thermal recovery rate, and above all, do not show any signs of fatigue even after 1 year of normal use.

EXAMPLE 2

Eight ml of an aqueous solution. 0.1M in $AgNO_3$, and 8 ml of an aqueous solution 0.10M in KBr and 0.01M in $CuBr_2$ were simultaneously added to 40 ml of a 10% polyvinylpyrrolidone aqueous solution over a 2 minute interval. Three ml of this solution were poured on a 2 × 2 glass plate and solvent was evaporated in an air circulating oven, having a relative humidity of about 50%, at 55° C for 40 minutes. A transparent, supple film of polyvinylpyrrolidone having photosensitive doped silver halide dispersed therein was obtained. Another glass plate was put on the top of the plastic film and the edges were sealed with epoxy resin.

EXAMPLE 3

A number of essentially plasticizer (water) free films having fine silver halide microcrystals dispersed therein were produced in accordance with th procedure of Example 2, except that the relative humidity in the curing oven is maintained at 20% or less and polyvinyl pyrrolidone was used as a polymer. A number of these dry, polyvinyl pyrrolidone films were placed in the oven chamber and with the temperature at 50° C, the humidity of the chamber was increased, step-wise, from 30% to 90%. Samples cured in excess of 2 hours in the oven at 30% and 40% humidity were essentially not photosensitive. Samples prepared under identical conditions except that the humidity in the oven chamber was adjusted to between 50% and 60% were photochromic, but exhibited poor thermal recovery rates (greater than 24 hours). However, samples prepared under these conditions, but at 70% and 80% humidity, showed good photo coloration and recovered in 10 to 30 minutes. Each of these latter samples were sealed between a pair of glass plates, using an epoxy resin as an edge sealer, and even after 1 year were observed to have retained their photochromic properties.

Since the water in the preceding examples served as a plasticizer for the system, it was hypothesized that other plasticizers might provide the necessary plasticizing effects for the observation of photochromism. On testing, the hypothesis provided correct when it was discovered that the photochromic effects could be produced in polyvinylpyrrolidone containing silver halide microcrystals when a non-aqueous plasticizer, such as glycerin, was added to the film forming solution in appropriate amounts. Many other plasticizers were likewise found to be effective, particularly those having hydroxy functional groups such as glycerin, ethylene glycol, and polyethylene glycol. The following examples illustrate the above disclosed principle.

EXAMPLE 4

To 50 ml of 10% polyvinylpyrrolidone in water, three grams of polyethylene glycol sold under the tradename Carbowax 600 were dissolved. Then, 10 me of a 0.1M KBr ml of a 0.1M KBe and 0.01M $CuBr_2$ aqueous solution were added to the mixture. After thorough mixing, 10 ml of a 0.1M $AgNO_3$ solution were added and the solution was stirred for 2 minutes. Five ml of the resulting sol were poured onto a glass plate edged with a gasket and placed in a humidity chamber (56° C, relative humidity = 20%) for 4 hours to dry. This treatment was sufficient to drive out sesstentially all water, but insufficient to remove significant amounts of polyethylene glycol plasticizer. Since a non volatile plasticizer was employed, it was not necessary to seal the photochromic element produced.

EXAMPLE 5

Fifty ml of a $10^{-3}$ $GMAgNO_3$ solution in methanol, 3 grams of polyvinylpyrrolidone, and 3 grams of glycerin were added together. To this solution, 50 ml of a solution $10^{-3}$ M in KBr and $10^{-4}$ in $CuBr_2$ were added. Every 10 minutes for 50 minutes, 10 ml of the film forming solution (total 50 ml) were poured onto a glass plate edged with a gasket. The solution on the plate was placed in a humidity chamber for 4 hours under the conditions of Example 4 to form a photochromic plastic disc. When the methanol had been driven off, the photochromic properties of the article produced were tested. The samples show good photo coloration and fading rate.

As can be seen from the above examples, the instant invention provides photochromic plastic materials which have a relatively long shelf life and sensitive photochromic properties. It is believed that the key to this sucess lies in regulating the amount of plasticizer in the films produced. In this regard, those skilled in the art will have little difficulty determining the optimum amount of plasticizer for a given system when appraised of the facts as indicated herein. Obviously, the amount of plasticizer in the system will depend upon the mass of the film formed, the nature of the film, and the particular plasticizer chosen. The plasticizer must also act as a solvent for the silver haldie forming salts or at least be compatible with the medium in which the halide crystals are formed, e.g., water, low molecular weight alcohols, and other liquids capable of dissolving $AgNO_3$ and halides of potassium, sodium, copper, etc. As can be seen from Examples 4 and 5, the medium for crystal formation and the plasticizer can comprise a mixed solution of a conventional plasticizer and a solvent such as water or alcohol. Ions such as $Li^+$, $Na^+$, $K^+$, $Rb^+$, $Cs^+$, $Tl^+$, $Cu^{++}$, $Ca^{++}$, $Mg^{++}$, $Sr^{++}$, $Ba^{++}$, $Zn^{++}$, $Be^{++}$, and mixtures thereof comprise non-limiting examples of ions which may be substitutued for $Ag^+$ ions. Up to 50 ion percent of the foregoing ions may be substituted for $Ag^+$ ions. Preferred activating ions, in addition to $Cu^+$, include $Fe^{++}$, $Cd^{++}$, and $S^-$ ions. Up to 10 ion percent of the foregoing activating ions may be substituted for $Ag^+$ ions.

While only two polymers have been disclosed in the preceding examples, those skilled in the art will be able to substitute other transparent polymers, e.g., polyalkyleneamines, polyacrylic acids, polymethacrylic acids, and polytetramethylene aminotriazole, etc., without difficulty.

Two parameters are important for successful practice of the process of the invention. First, it is necessary that the particles of silver halide be dispersible in the medium selected and not coalesce or otherwise grow too large. In this regard, the use of polyvinylalcohol or polyvinylpyrrolidone as the light transmissive polymer is advantageous since these are particularly effective ripening inhibitors. However, those skilled in the art will readily be able to utilize silver halide crystal formation processes developed for use in photographic films. Second, the polymer must be sufficiently light transmissive so that it allows photolytic activation of the silver halide particles.

The invention may be embodied in other specific forms without departing from the spirit or essential characteristic thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A photochromic plastic element comprising a plurality of photosensitive silver halide particles less than 1000 A in particle size containing activating ions which act as hole traps, said particles being dispersed within a cast, shape-retaining, light-transmissive matrix comprising at least one polymer having the ability to inhibit ripening of silver halide particles produced in solution, said matrix containing an effective amount of a plasticizer to produce an environment suitable for repetitive activations and deactivations of the silver halide particles.

2. The photochromic element of claim 1 wherein said light-transmissive matrix includes an amount of plasticizer effective to render said matrix non-brittle.

3. The photochromic element of claim 2 further comprising means for sealing said material to prevent loss of said plastisizer.

4. The photochromic element of claim 1 wherein the $Ag^+$ ion in said silver halide particles is replaced with up to 50 ion percent of an ion chosen from the group consisting of $Li^+$, $Na^+$, $K^+$, $Rb^+$, $Cs^+$, $Tl^+$, $Ca^{++}$, $Mg^{++}$, $Sr^{++}$, $Ba^{++}$, $Zn^{++}$, $Be^{++}$, $Cu^{++}$, and mixtures thereof.

5. The photochromic element of claim 1 wherein the $Ag^+$ ion in said silver halide particles is replaced with up to 10 ion percent of an ion chosen from the group consisting of $Cu^+$, $Fe^{++}$, $Cd^{++}$, $S^=$, and mixtures thereof.

6. The photochromic element of claim 1 wherein the silver halide particle is chosen from the group consisting of AgCl, AgBr, AgI, and mixtures thereof.

7. The photochromic element of claim 1 wherein said silver halide particles contain copper ions, said matrix comprises polyvinylpyrrolidone, and said polyvinylpyrrolidone contains water as a plasticizer.

8. The photochromic element of claim 1 wherein said matrix contains a plasticizer having hydroxy functional groups.

9. The photochromic element of claim 8 wherein said plasticizer is chosen from the group consisting of glycerin, ethylene glycol, and polyethylene glycol.

10. The photochromic element of claim 1 encased in a transparent material to form a photochromic optical device.

11. The photochromic element of claim 1 wherein said polymer is chosen from the group consisting of polyvinylpyrrolidone, polyvinylalcohol, polyacrylic acids, polymethacrylic acids, polyalkylenamines, polyalkylenimines, and mixtures thereof.

12. A process for producing a photochromic plastic element comprising the steps of:
forming photosensitive silver halide crystals containing activating ions which act as hole traps, said crystals being less than 1000 A in particle size and being formed in a solution of a light transmissive polymer capable of acting as a ripening inhibitor for the formation of silver halide grains and dissolved in a plasticizer therefor;
casting said solution; and
removing an effective amount of said plasticizer to form a cast, non-brittle, shape retaining photochromic element.

13. The process of claim 12 wherein said polymer is chosen from the group consisting of polyvinylpyrrolidone, polyvinylalcohol, polyacrylic acids, polymethacrylic acids, polyalkylenamines, polyalkylenimines, and mixtures thereof.

14. The process of claim 12 further comprising the step of encasing said element to prevent loss of plasticizer.

15. The process of claim 12 wherein said forming step is effected by adding a solubilized halide salt, a solubilized silver salt, and a solubilized copper salt together in said solution.

16. The process of claim 12 wherein the crystals formed contain an ion chosen from the group consisting of $Cu^+$, $Li^+$, $Na^+$, $K^+$, $Rb^+$, $Cs^+$, $Tl^+$, $Cu^{++}$, $Ca^{++}$, $Mg^{++}$, $Sr^{++}$, $Ba^{++}$, $Zn^{++}$, $Cd^{++}$, $Be^{++}$, $Fe^{++}$, $S^{--}$, and mixtures thereof.

17. The process of claim 12 wherein said plasticizer is water.

18. The process of claim 13 wherein said plasticizer is chosen from the group consisting of plasticizers which contain hydroxy functional groups.

19. The process of claim 18 wherein said plasticizer is chosen from the group consisting of glycerin, ethylene glycols, polyethylene glycols, and mixtures thereof.

20. The process of claim 12 wherein said solution comprises water and a water soluble plasticiizer compatible with said polymer.

21. Process for producing a photochromic plastic element comprising the steps of:
forming a solution of a polymer chosen from the group consisting of polyvinylpyrrolidone and polyvinylalcohol, water, and a plasticizer chosen from the group consisting of glycerin, ethylene glycol, and polyethylene glycol;
adding solutions containing $Ag^+$ ions, halides chosen from the group consiting of $Br^-$, $Cl^-$, $I^-$, and an activating ion chosen from the group consisting of $Cu^+$, $Cd^{++}$, $Fe^{++}$, $S^{--}$, and mixtures thereof to form activated, photosensitive silver halide crystals having a particle size less than 1000 A in said polymer solution; and
removing the water from the solution to form a non-brittle, shape-retaining plastic element.

22. The process of claim 21 further comprising the step of encasing said plastic element to form a photochromic optical device.

23. Process for producing a photochromic element comprising the steps of:
forming an aqueous solution of at least one light transmissive water soluble polymer;
adding aqueous solutions containing silver ions, halide ions, and copper ions to form activated, photosensitive silver halide particles less than 1000A particle size in said polymer solution;
removing the water from the solution to form a plastic element containing an effective amount of water to maximize the photochromic properties of said element; and
encasing said photochromic plastic element to prevent further loss of water.

24. The process of claim 23 wherein said polymer is chosen from the group consisting of polyvinylpyrrolidone, polyvinylalcohol, polyacrylic acids, polymethacrylic acids, polyalkylenamines, polyalkylenimines, and mixtures thereof.

* * * * *